INVENTORS:
WILLIAM C. PLUNK,
ALEXANDER SILVER,
BY
Attorney.

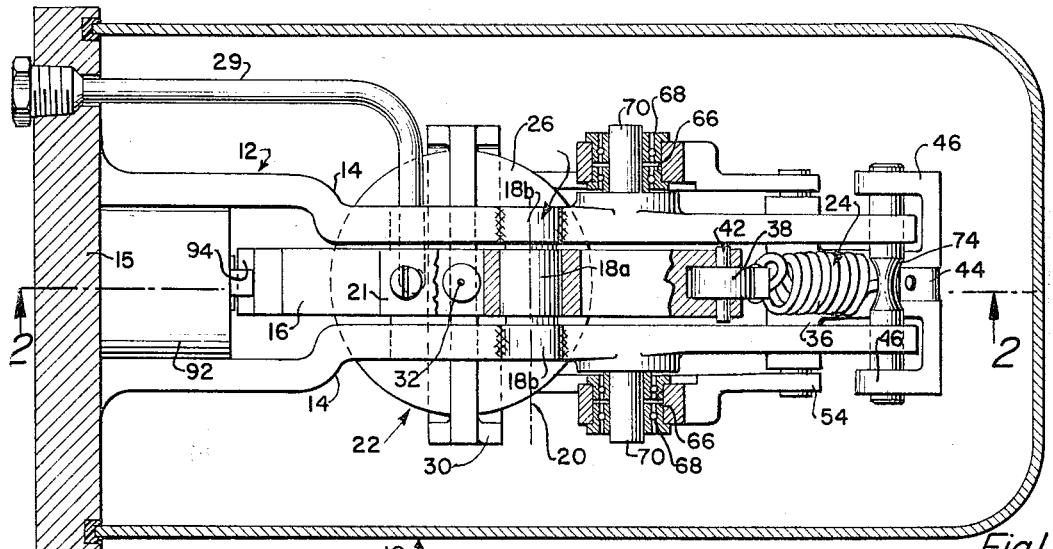
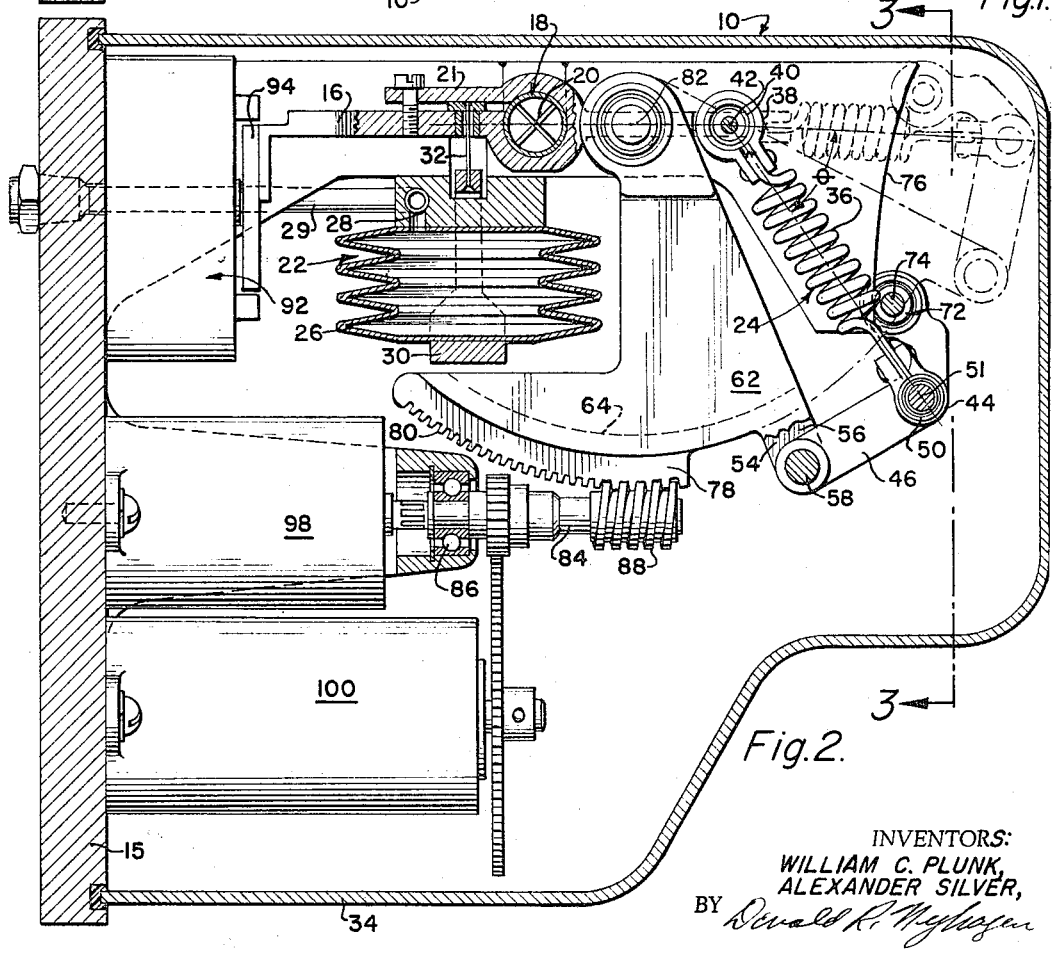

United States Patent Office 3,285,071
Patented Nov. 15, 1966

3,285,071
PRESSURE ALTITUDE VECTOR BALANCED
TRANSDUCER
William C. Plunk, San Pedro, and Alexander Silver, Tarzana, Calif., assignors to The Garrett Corporation, Los Angeles, Calif., a corporation of California
Filed June 13, 1963, Ser. No. 287,685
15 Claims. (Cl. 73—407)

This invention relates generally to force balance instruments of the balanced beam type. The invention relates more particularly to a force balance instrument of this type wherein the instrument beam is restored to balance in response to a change in a force being monitored, by adjusting the angle between the longitudinal axis of the beam and the line of action of one of the forces active on the beam.

Force balance instruments of the balanced beam type are well known in the art and are commonly employed to monitor or measure fluid pressures and fluid pressure ratios. The typical force balance instrument is equipped with a balance beam rockably supported on a fulcrum, means for applying to the beam opposing forces, including the force or forces to be monitored, in such manner that the forces produce opposing moments on the beam, and means for regulating the balance of the beam. Generally, the instrument is equipped with feed-back means for operating the balancing means automatically in response to displacement of the beam from its neutral position, thereby to normally maintain the beam in balance in its neutral position.

In the existing force balance instruments of the kind under discussion, the beam is balanced either by shifting the fulcrum of the beam lengthwise of the latter so as to regulate the relative lever arm lengths of the forces active on the beam, or by regulating the magnitude of one of the forces. While these existing instruments are capable of satisfactory operation in many applications, they possess certain inherent deficiencies which this invention seeks to overcome. The existing instruments, for example, are excessively complex in construction and costly to manufacture. These instruments also have a relatively low inherent accuracy; that is to say, manufacture of the existing instruments involves a large number of machining and assembly operations which must be performed with a very high degree of precision to attain the high over-all instrument accuracy demanded in many force monitoring and measuring applications. Further, the existing instruments are difficult to counterbalance with sufficient accuracy to provide the instruments with triaxial insensitivity to environmental acceleration forces. Finally, the existing instruments possess a relatively low environmental resistance; that is the instruments are prone to damage by relatively low order environmental acceleration forces.

In the case of the existing force balance instruments with movable fulcrums, the foregoing deficiencies result primarily from the movable carriage and rails, which are required to support the fulcrum for movement along the beam and which are extremely difficult to machine and assembly with sufficient precision to provide the instruments with the high over-all operational accuracy demanded in many force monitoring applications. Moreover, even though initially fabricated with sufficient precision to attain the required over-all operational accuracy, the fulcrum supporting carriage and rails have low environmental resistance.

A general object of this invention is to provide an improved force balance instrument of the balanced beam type which avoids the foregoing and other deficiencies of the existing force balance instruments of this type.

Another object of the invention is to provide a force balance instrument of the character described wherein the balance beam is restored to balance in response to a change in a monitored force by regulating the angle between the longitudinal axis of the instrument balance beam and the vector or line of action of a force active on the beam.

Yet another object of the invention is to provide a force balance instrument of the character described wherein the regulated balancing or restoring force is modulated by a unique cam mechanism to create a desired functional relation between the input and the output of the instrument.

An object of the invention associated with the foregoing object is to provide a fluid pressure transducer embodying the present improved force balance mechanism and wherein the output of the transducer varies according to a log function of the input pressure, whereby the transducer furnishes an output which varies linearly with altitude.

A further object of the invention is to provide a force balance instrument of the character described wherein all internal motions are rotary rather than rectilinear, whereby the instrument is relatively simple in construction, economical to manufacture, rugged, requires a minimum number of precision machining and assembly operations, possesses a relatively high inherent accuracy and environmental resistance, and is otherwise superior to the existing force balance instruments of the balance beam type.

Other objects, advantages, and features of the invention will become apparent to those skilled in the art as the description proceeds.

Briefly, the objects of the invention are attained by providing a force balance instrument equipped with a balance beam rockably supported on a fixed fulcrum. Operatively connected to the beam are force applying means for producing on the beam opposing moments including a moment proportional to a force to be monitored or measured. One of these force applying means is pivotally attached to the beam in such manner as to accommodate angular adjustment of the latter means with respect to the beam, in a plane normal to the rocking axis of the beam, thereby to regulate the angle between the longitudinal axis of the beam and the direction line or vector of the balancing force exerted on the beam by said latter means. A change in this angle varies the magnitude of the component of the balancing force normal to the beam and, thereby, the moment produced by the latter force on the beam.

The adjustable force applying means is angularly positioned by a balancing mechanism including a rotary shaft. In a typical force balance instrument this shaft is driven by a servomotor controlled by a feed-back system which is responsive to displacement of the beam from its neutral position and operates to maintain the beam in balance in its neutral position by regulating the angle of the balancing force. The output of the instrument may be taken from this shaft.

Also included in the instrument is a cam mechanism which modulates the balancing force, during regulation of the angle of the latter force, in such manner as to create a desired functional relationship between the input to the instrument and the instrument output. In the illustrative embodiment of the invention, for example, the input to the instrument is a fluid pressure and the modulating cam mechanism introduces a log function into the instrument output, whereby the latter varies linearly with a log function of the input pressure, and, therefore, with altitude.

The invention will be better understood from the following detailed description of a presently preferred embodiment thereof taken in connection with the attached drawings, wherein:

FIG. 1 is a plan view of the present instrument with the instrument case and other parts in section;

FIG. 2 is a section taken on the line 2—2 in FIG. 1;

Figure 3:
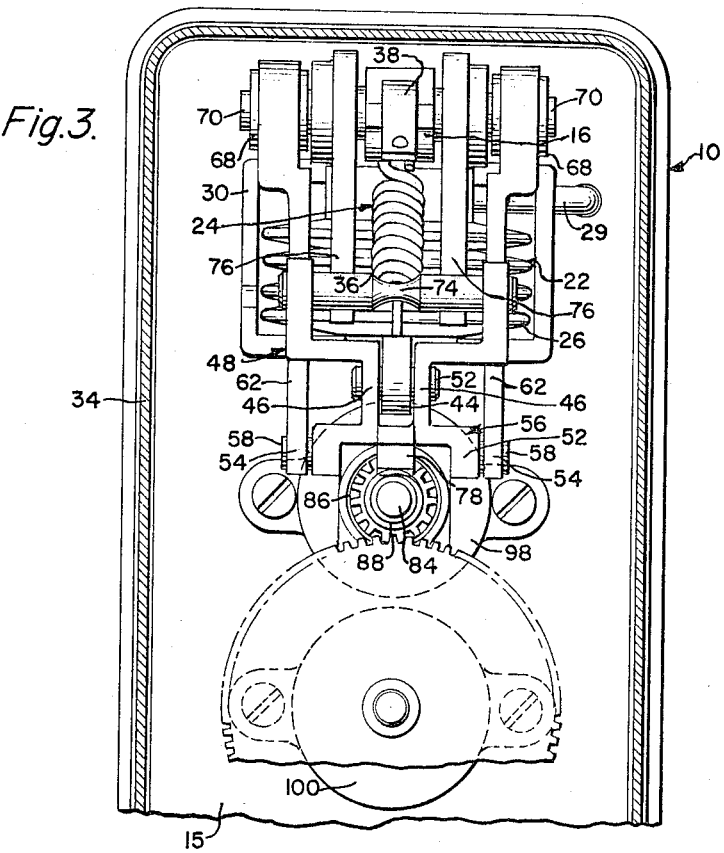
FIG. 3 is a section taken on the line 3—3 in FIG. 2.

The vector balanced transducer 10 illustrated in these drawings comprises a supporting frame 12 including a pair of spaced, generally parallel side walls 14. Located between these side walls is the balance beam 16 of the instrument. Beam 16 is rockably supported on the frame 12 by fixed fulcrum means 18 for pivoting on an axis 20 normal to the frame side walls 14 and to the beam itself and located intermediate the ends of the beam. While any kind of suitable fulcrum can be used to pivotally support the balance beam on the instrument frame, it is preferred to use a so-called flexural pivot for this purpose because of the relatively low friction and high environmental resistance of this kind of pivot as compared to other types of fulcrum, such as knife edges or bearings. For this reason, the fulcrum means 18 illustrated in the drawings are shown to comprise a conventional flexural pivot having relatively rotatable center and end portions 18a and 18b, respectively. The center portion 18a of the pivot 18 is fixed to the balance beam 16 by a screw clamp 21 on the beam and the end portions 18b of the pivot extend through and are fixed in openings in the frame walls 14.

The illustrated force balance instrument 10 is equipped with two force applying means 22 and 24 producing opposing moments on the balance beam 16. Means 22 exerts a force to be monitored or measured while means 24 comprises a balancing means which exerts a resilient restoring or balancing force opposing the monitored force exerted by means 22. Since the illustrated instrument is designed to operate as a pressure transducer, the monitored force applying means 22 comprises a flexible bellows 26. The side walls 14 of the instrument frame 12 are cut away to accommodate the bellows, as shown.

The upper end of the bellows 26, as the latter is viewed in FIG. 2, is attached to the frame walls 14 and is provided with an inlet passage 28 communicating with an inlet tube 29 which extends through the base 15 of the instrument frame 12 for connection to a source of fluid pressure to be monitored. In some cases, this pressure may be simply ambient atmospheric pressure. Encompassing the bellows is a frame 30 to which the lower end of the bellows is attached, as shown. The upper end of bellows frame 30 is operatively connected to the balance beam 16 by a wire flexure 32. It is evident, therefore, that fluid pressure in the bellows 26 produces a counterclockwise moment on the beam, as the latter is viewed in FIG. 2. The illustrated force balance instrument or pressure transducer 10 is enclosed in a hermetic evacuated case 34 which is sealed to the frame base 15.

The second force applying means 24 of the instrument 10 comprises a tension coil spring 36 to one end of which is attached a bearing retainer ring 38. This retainer ring is received in a slot in the adjacent end of the balance beam 16. Fixed in a bore through the retainer ring is the outer race of a ball bearing 40 the inner race of which is fixed to a pin 42 carried by the balance beam. The other end of spring 36 is attached to a second bearing retainer ring 44 which is positioned between the arms 46 of a bifurcated link 48. Extending through the second ring is a bore in which is fixed the outer race of a ball bearing 50, the inner race of which is fixed to a pin 51 carried by the link 48.

Bifurcated link 48 has a bell-crank-like configuration in side elevation, as may be observed in FIG. 2, and terminates at its lower end, as viewed in the latter figure, in a transverse cross member 52 which is located between a pair of depending brackets 54 on a bifurcated sector 56. Cross member 52 is pivotally attached to the brackets 54 by cross pins 58. Sector 56 has a pair of spaced, parallel, generally sector-shaped side plates or arms 62 which are joined along their curved edge by a cross wall 64. The side plates 62 of the sector 56 straddle the side walls 14 of the instrument frame 12 and have aligned bores 66 at their upper ends. In these bores are fixed the outer races of ball bearings 68, the inner races of which are fixed to coaxial pins 70 press fitted or otherwise firmly attached to the side walls 14 of the instrument frame 12. Sector 56 is thereby pivotally mounted on the frame 12. The pivot axes of the several pivotal connections for the spring 36, link 48, and sector 56 parallel the pivot axis 20 of the balance beam 16.

As may be best observed in FIG. 3, the free ends of the arms 46 of the bifurcated link 48 are spaced to straddle the side walls 14 of the instrument frame 12. Extending through these free ends are aligned bores in which are fixed the outer races of ball bearings 72, the inner races of which are fixed to a cross pin 74. Cross pin 74, which is freely rotatable, seats against the opposing edge surfaces 76 of the frame walls 14. As will be discussed shortly, the wall edge surfaces 76 form cam surfaces and pin 74 forms a cam follower for cooperation with the cam surfaces. It is evident that the tension in coil spring 36 resiliently holds the cam follower 74 in contact with the cam surfaces 76.

Depending from the under surface of the curved sector cross wall 64, midway between the sector side walls 62, is a curved rib 78 formed with gear teeth 80, whereby the rib 78 forms the segment of a worm wheel centered on the swinging axis 82 of the sector 56. A jackshaft 84, rotatably mounted and axially restrained by a bearing 86, carries a worm 88 which meshes with the worm wheel segment 78. Rotation of the jack-shaft thus swings or rotates the sector 56 about its axis 82.

As the sector 56 is thus rotated by the jackshaft 84, the cam follower 74 rides along the cam surfaces 76 in one direction or the other, depending upon the direction of rotation of the jackshaft. Spring 36 is thereby also rotated about its pivotal connection to the balance beam 16, to increase or decrease, as the case may be, the angle θ between the axes of the spring and the longitudinal axis of the beam.

Figure 4:
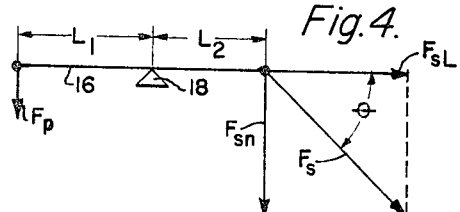
FIG. 4 is a force balance diagram of the instrument.
Figure 5:
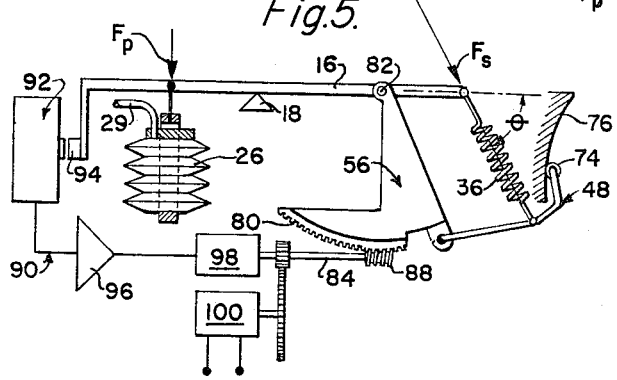
FIG. 5 is a diagrammatic illustration of the instrument.

Referring now to FIGS. 4 and 5, it is evident that the force $F_p$ created by fluid pressure in the bellows 26 produces a counterclockwise moment on the balance beam 16. The tension force $F_s$ in the spring 36 produces an opposing clockwise moment on the beam. The spring force $F_s$ can be resolved into two components, one ($F_{sn}$) acting normal to the beam and the other ($F_{sl}$) acting longitudinally of the beam. Obviously, only the normal force $F_{sn}$ is effective to produce a clockwise moment on the beam. The magnitude of the normal force $F_{sn}$, and hence the magnitude of the clockwise moment produced by the spring 36, will be observed to be a sine function of the angle θ between the axis of the spring 36, or the line of action or vector of the spring force $F_s$, and the longitudinal axis of the balance beam. It is evident, therefore, that the clockwise moment produced on the beam 16 by the spring 36 may be regulated by rotating the jackstaft 84 to rotate the sector 56, the latter moment increasing when the sector is rotated in the clockwise direction in FIG. 5 and decreasing when the sector is rotated in the opposite direction. As will be explained later, the movement of the cam follower 74 along the cam surfaces 76 which occurs during rotation of the jackshaft 84 to vary the angle θ, acts to modulate the spring force $F_s$ in accordance with the shape of the cam surfaces. Accordingly, the resultant movement produced on the beam 16 by the spring 36 varies according to a combined function of the angle θ and the shape of the cam surfaces 76 during rotation of the jackshaft 84.

Thus, the balance beam 16 may be continuously maintained in balance in a given neutral position by appropriately positioning the jackshaft 84. As in most force balance instruments, the balance beam 16 of the present instrument is automatically maintained in balance in its neutral position by operation of a feed-back loop 90 (FIG. 5) which is responsive to displacement of the beam from the neutral position. To this end, the feed-back loop 90 includes, in the usual way a differential transformer 92, the armature 94 of which is fixed to the balance beam 16. This transformer generates a null signal when the beam occupies its neutral position and an error signal when the beam is displaced from the neutral position, the phase and amplitude of which error signal is related to the direction and amount of the beam displacement.

Also included in the feed-back loop is a servo amplifier 96 which amplifies the output of the differential transformer 92 and a servomotor 98 which is electrically coupled to the amplifier 96 and drivably coupled to the jackshaft 84 for angularly positioning the latter in accordance with the amplified output from the differential transformer 92.

The feed-back loop 90 is arranged in the usual way so that displacement of the balance beam 16 in either direction from its neutral position effects energizing of the servomotor 98 in the proper direction to increase or decrease the vector angle $\theta$ as required to restore the beam to balance in its neutral position.

Since the illustrated instrument is hermetically encased, the servomotor 98 is preferably located within the instrument case 34 to eliminate the necessity of shaft seals. For this reason also, the output of the instrument is preferably provided by a potentiometer or synchro transmitter 100 located in the instrument case 34 and drivably coupled to the jackshaft 84. The electrical leads for the motor 98 and synchro 100 can, of course, be brought to the exterior of the instrument case 34 without difficulty to permit the amplifier 96 to be located externally of the case.

Returning now to the cam mechanism 74, 76 for modulating the force $F_s$ of the instrument spring 36, it will be recalled that during rotation of the sector 56 by the jackscrew 84 to vary the angle $\theta$ between the line of action or vector of the spring force $F_s$ and the longitudinal axes of the balance beam 16, the cam follower 74 rides along the cam surfaces 76. Now it is evident that these cam surfaces may be shaped to effect an increase or decrease in the length of the spring 36, and thereby modulate the spring force $F_s$, during movement of the cam follower 74 along the surfaces. This modulation of the spring force $F_s$ may be caused to occur in accordance with any desired function by appropriately shaping the cam surfaces.

In the illustrated force balance instrument or pressure transducer, for example, the cam surfaces 76 are shaped to modulate the spring force $F_s$ in such manner that the angular position of the jackshaft 84, bears a linear relationship to the log of the fluid pressure within the bellows 26. In this way, the instrument is useful as an altimeter which furnishes an output linearly related to altitude.

Thus, referring to FIG. 4, it is evident that when the beam is balanced in its neutral position, shown, the following force balance relationships exist.

$$F_p L_1 = F_{sn} L_2 \quad (1)$$

which can be rewritten as $$PAL_1 = F_s L \sin \theta \quad (2)$$

from which we obtain $$\frac{F_s}{K_1} \sin \theta = P \quad (3)$$

where A is the effective area of the bellows 26, P is the pressure in the bellows, and $K_1$ is a constant equal to $$\frac{AL_1}{L_2}$$

It is further evident from FIGS. 2 and 5 that the spring force $F_s$ is a function of the angle $\theta$ and the shape of the cam surfaces 76. Accordingly, the spring force $F_s$ can be made to vary according to any desired function of the angle $\theta$ by appropriately shaping the cam surfaces. Let us assume that the cam surfaces are so shaped that the spring force $F_s$ varies according to the following function of the angle $\theta$ $$F_s = \frac{K_1 e^\theta}{\sin \theta} \quad (4)$$

With this assumption, and combining Equations 3 and 4, we obtain $$e^\theta = P \quad (5)$$

or $$\theta = \log_e P \quad (6)$$

It is evident from FIGS. 2 and 5 that if we assume the output device 100 of the instrument is a linear device, such as a linear potentiometer, the following relationship exists.

$$E_o = K_2 \phi = K_3 \theta \quad (7)$$

when $E_o$ is the voltage output of the device, $\phi$ is the angle of the shaft of the device, and $K_2$, $K_3$ are constants dependent, respectively, upon the electrical characteristics of the output device and the gear ratio between the worm 88 and the sector gear 80. Combining Equations 6 and 7 we obtain $$E_o = K_3 \log_e P \quad (8)$$

Equation 8 clearly demonstrates that if the cam surfaces 76 of the present instrument are properly shaped, the output $E_o$ of the instrument can be made to vary according to the log of the input Pressure P to the instrument and, therefore linearly with altitude.

In a practice however, various ancillary factors, such as sensitivity, operating range, etc., will influence the actual shape of the cams necessary to provide the instrument with optimum operating characteristics. For this reason, the actual shape of the cam surfaces in a particular instrument may deviate from the shape necessary to yield a true log function output. It is obvious, of course, that the cam surfaces may be deliberately shaped to yield some other output function than a log function.

In operation of the present force balance instrument, displacement of the balance beam 16 from its neutral position activates the feed-back loop 90, causing the latter to energize the servomotor 98 to adjust the angle $\theta$ of the spring 36 in the appropriate direction to restore the beam to balance in its neutral position. The output device 100 of the instrument is thereby driven to constantly generate an output related to the monitored pressure P, which function approaches a log function in the instrument shown. It is evident that the instrument may be designed to provide a mechanical output, such as a rotary shaft position, rather than an electrical output and that the spring 36 may be replaced by a second bellows responsive to a second monitored pressure admitted to the interior of the instrument case 34, thereby to provide a pressure ratio output function.

Various other modifications of the invention are possible, of course, within its spirit and scope.

We claim:
1. A force balance instrument, comprising:
   a pivoted balance beam;
   first force applying means operatively connected to said beam for exerting on the latter a first force which produces a first moment in one direction on the beam;

second force applying means pivotally connected to said beam for exerting on the latter a second force which produces a second moment on the beam opposing said first moment;

a sector pivotally mounted on an axis parallel to the pivoted axis of said beam;

a rotary jackshaft tangent to said sector;

gear means operatively connecting said jackshaft and sector whereby the latter is rotated about the pivot axis in response to rotation of said jackshaft;

a link pivotally connected at one end to said sector and intermediate its ends to said second force applying means, whereby rotation of said sector by said jackshaft rotates said second force applying means about its pivotal connection to said beam, thereby to adjust the angle between the longitudinal axis of said beam and the line of action of said second force and vary said second moment;

a cam follower on the other end of said link; and cam means over which said cam follower moves during rotation of said sector to adjust said angle, and said cam means being shaped to adjust said second force according to a predetermined function during adjustment of said angle.

2. The subject matter of claim 1 wherein:

said first force applying means is a fluid pressure actuated force applying means and said cam means is shaped to produce an approximately linear relation between the angular position of said jackshaft and the log of fluid pressure in said first force applying means.

3. A force balance instrument, comprising:

a pivoted balance beam;

first force applying means operatively connected to said beam for exerting on the latter a first force which produces a first moment on one direction on the beam;

second force applying means operatively connected to said beam for exerting on the latter a second force which produces a second moment on the beam opposing said first moment; and means for adjusting the angle between the longitudinal axis of said beam and the line of action of only one of said forces, said adjusting means including means for adjusting the magnitude of one of said forces according to a predetermined function in response to adjustment of said angle.

4. The subject matter of claim 3 wherein:

the force applying means applying the other of said forces is responsive to fluid pressure;

said means for adjusting said angle includes a rotary jackshaft; and said angle adjusting means comprises cam means which are shaped to create an approximately linear relationship between the angular position of said jackshaft and the log of fluid pressure in said other force applying means.

5. A force balance instrument, comprising:

a pivoted balance beam;

first force applying means operatively connected to said beam for exerting on the latter a first force which produces a first moment in one direction on the beam;

second force applying means including a spring operatively connected to said beam for exerting on the latter a spring force which produces a second moment on the beam opposing said first moment; and means for adjusting the angle between the longitudinal axis of said beam and the line of action of only one of said forces, said adjusting means including means for adjusting the magnitude of one of said forces according to a predetermined function in response to adjustment of said angle.

6. A force balance instrument comprising:

a pivoted balance beam;

first force applying means operatively connected to said beam for exerting on the latter a first force which produces a first moment in one direction on the beam;

a spring pivotally connected at one end to said beam;

tensioning means connected to the other end of said spring, whereby the latter is tensed to exert on the beam a spring force which produces a second moment on the beam opposing said first moment; and means for shifting said tensioning means to adjust the angle between said spring force and the longitudinal axis of said beam and simultaneously to adjust the spring force as the angle is adjusted.

7. The subject matter of claim 6 wherein:

said tensioning means includes cam means for adjusting the tension in said spring during shifting of said tensioning means to adjust said angle, thereby to adjust said spring force according to a predetermined function.

8. The subject matter of claim 7 wherein:

said first force applying means is a flexible fluid pressure bellows;

said means for shifting said tensioning means includes a rotary jackshaft; and said cam means is shaped to create an appropriately linear relation between the anuglar position of said jackshaft and the log of pressure in said bellows.

9. A force balance instrument, comprising:

a pivoted balance beam;

first force applying means operatively connected to said beam for exerting on the latter a first force which produces a first moment in one direction on the beam;

second force applying means operatively connected to said beam for exerting on the latter a second force which produces a second moment in the beam opposing said first moment, means responsive to displacement of said beam from a given neutral position for generating a feed-back signal related to said displacement; and means controlled by said feed-back signal for adjusting the angle between the longitudinal axis of said beam and the line of action of only one of said forces and simultaneously adjusting one of said forces, thereby to maintain said beam in balance in said neutral position.

10. A force balance instrument comprising:

a pivoted balance beam;

a force applying means operatively connected to said beam for exerting on the latter a first force which produces a first moment in one direction on said beam;

a coil spring pivotally connected at one end to said beam;

a sector pivotally mounted on an axis parallel to the pivot axis of said beam and disposed substantially in the plane of said beam;

a link pivotally attached at one end to said sector and pivotally attached intermediate its end to the other end of said spring;

a cam follower on the other end of said link;

cam means engaged by said cam follower for maintaining a tension in said spring whereby the latter exerts on said beam a spring force which produces a second moment on the beam opposing said first moment;

said sector being rotatable to rotate said spring about its pivotal connection to said beam, thereby to adjust the angle between the longitudinal axis of said beam and the line of action of said spring force;

said cam follower moving over said cam means to modulate said spring force during rotation of said sector to adjust said angle;

a rotary jackshaft tangent to said sector and mounting a worm;

a worm wheel segment on said sector meshing with said worm, whereby rotation of said jackshaft rotates said sector;

means responsive to displacement of said beam from a neutral position for generating a feed-back signal related to said displacement; and a servomotor controlled by said feed-back signal and drivably coupled to said jackshaft for positioning the latter in response to said signal, thereby to maintain said beam in balance in said neutral position.

11. The subject matter of claim 10, wherein:

said force applying means is a fluid pressure bellows; and said cam means is shaped to create an approximately linear relation between the angle of said jackshaft and the log of fluid pressure in said bellows.

12. A force balance instrument, comprising:

a frame member;

a balance beam pivotally mounted on said frame member;

first force applying means operatively connected to said frame member and said beam for exerting on the latter a first force which produces a first moment in one direction on said beam;

a swingable arm member operatively connected with said frame member for swinging about an axis;

a link member forming an operative connection between said frame and swingable members;

second force applying means operatively connected to said link member and said beam and spaced on said beam from the intersection of said axis and said beam for exerting on the latter a second force which produces a second moment on the beam opposing said first moment; and means for angularly adjusting said swingable arm member in response to variations of said first force, thereby to balance said beam.

13. The subject matter of claim 12 wherein:

said link member comprises a cam arranged to cooperate with a cam surface formed on one of said frame and swingable members.

14. The subject matter of claim 12 wherein:

said link member comprises a cam arranged to cooperate with a cam surface on said frame member.

15. The subject matter of claim 12 wherein:

said swingable member is pivotally mounted on said frame member, and said link member is pivotally mounted on said swingable member and comprises a cam arranged to cooperate with a cam surface on said frame member.

References Cited by the Examiner

UNITED STATES PATENTS 2,729,780 1/1956 Miller et al. _____ 73—410 X
3,049,007 8/1962 Jolins _____ 73—182

FOREIGN PATENTS 681,544 9/1939 Germany.

LOUIS R. PRINCE, *Primary Examiner.*

DONALD O. WOODIEL, *Assistant Examiner.*